Figures 1, 2:
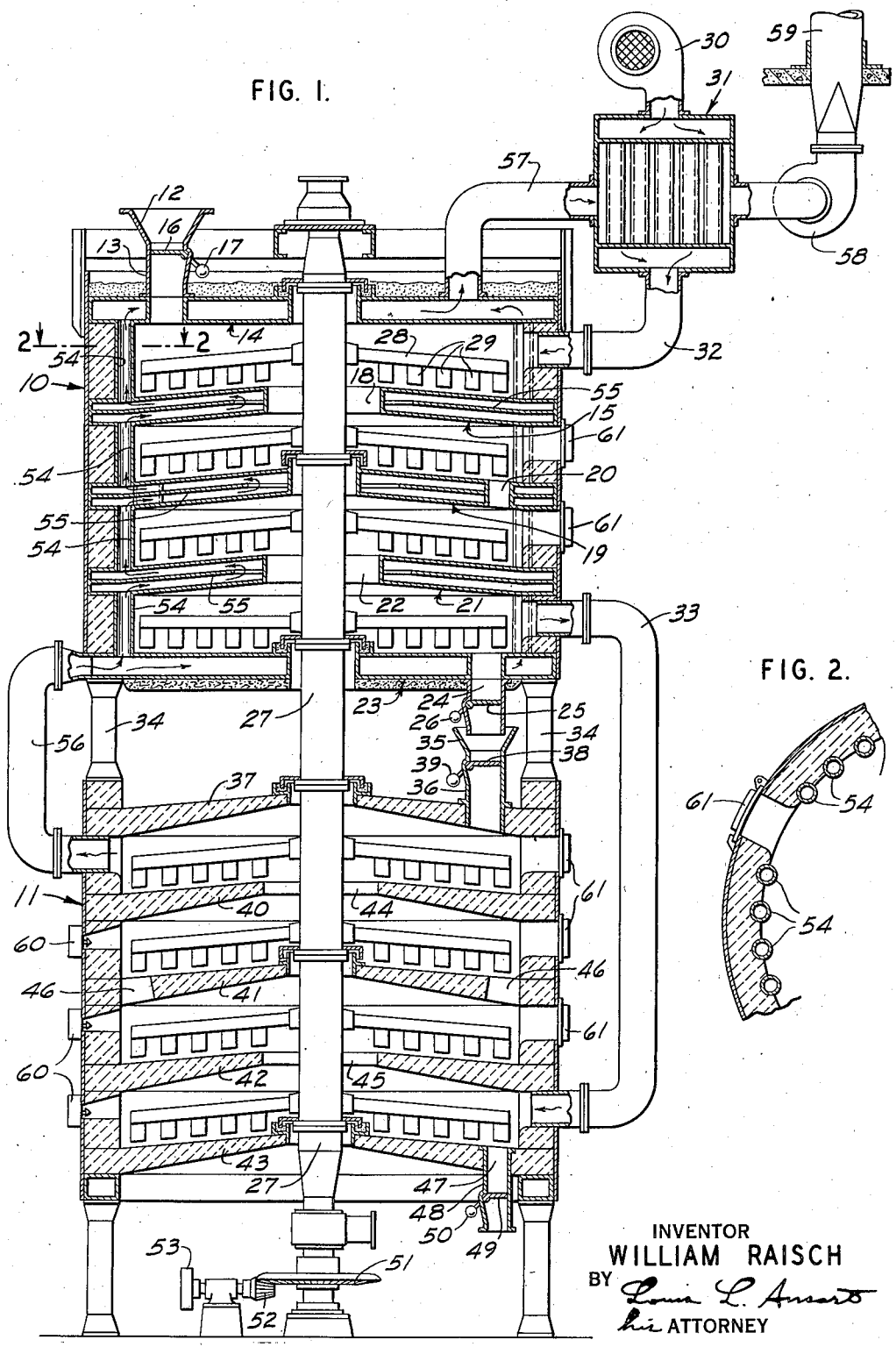

Aug. 30, 1938.　　　W. RAISCH　　　2,128,472
INCINERATION
Filed Dec. 2, 1936

INVENTOR
WILLIAM RAISCH
BY *Louis L. Ansart*
his ATTORNEY

Patented Aug. 30, 1938

2,128,472

UNITED STATES PATENT OFFICE 2,128,472

INCINERATION

William Raisch, New York, N. Y., assignor to Underpinning & Foundation Co., Inc., New York, N. Y., a corporation of New York Application December 2, 1936, Serial No. 113,814

9 Claims. (Cl. 110—12)

The present invention relates to treatment of material involving a preliminary or drying stage in which moisture and volatile constituents are driven off as by subjecting the material to heat and contact with a stream of air preferably preheated, and a final incineration stage in which the dried material and the gases and vapors from the drying stage are burned substantially completely thus eliminating noxious odors. The invention, although adapted for the treatment of other materials, is particularly adapted for the treatment of sewage solids, garbage and similar materials. The present invention comprises improvements on my applications Serial No. 104,916, filed October 10, 1936, and Serial No. 110,033, filed November 10, 1936.

The principal objects of the invention are to provide a novel, advantageous and efficient form of apparatus for drying and burning or roasting and a novel process for effecting treatment of this kind.

The apparatus embodying the invention may comprise two separate tiered multiple-hearth furnaces, one of which is used as a dryer and the other as a burner or incinerator. In each of these furnaces, the solid material under treatment is fed downwardly from hearth to hearth through outlets associated with the hearths, the material being fed in at the top of the furnace through a gas seal and the resulting material being discharged from the lowermost hearth through a corresponding gas seal. By thus forming the apparatus in two distinct parts, the drying and burning operations can be controlled largely independently of each other. Although the furnaces may be arranged in different positions relative to each other, preferably the drying furnace is supported on the top of the burning furnace or incinerator with a substantial space between the lowermost hearth of the dryer furnace and the top of the burner furnace.

The hearths of each furnace may comprise in alternation, hearths with central discharge openings and with peripheral discharge openings, to which discharge openings or outlets the material at the various hearths is fed by suitable rabbling devices preferably carried by a vertical shaft which may be common to both furnaces. Also, the stream of preheated air preferably passes downwardly through the drying furnace and takes up moisture and volatile matter and then is passed to the lowermost compartment of the burner furnace where it is passed upwardly and subjected to high enough temperatures to eliminate noxious odors, if any.

Preferably the draft in the dryer is down or concurrent with the flow of material and in the burning furnace is up or countercurrent to the flow of material. The hot gases of combustion discharged from the burning furnace or incinerator may be utilized in the dryer by using hollow hearths as well as a hollow top in the dryer, and passing the hot gases through the lower hearth or bottom of the drying section and then in series through the various hearths above the bottom and through the hollow top from which the hot gases may be passed by an induced draft to a stack through a heat exchanger which serves to preheat air supplied to the upper part of the dryer. For transfer of the hot gases from each hollow hearth or tray to the next higher, use may be made of a plurality of ducts or tubes at the inner surface of the peripheral wall of the dryer or drying furnace.

Other objects, features and advantages will appear upon consideration of the following description and of the drawing, in which:

Figure 1 is a view in several sections of apparatus embodying a preferred form of the invention; and Figure 2 is a section taken on the line 2—2 of Figure 1.

Referring to the drawing, the apparatus of the present invention may include a dryer or drying furnace 10 and a burning furnace 11, both of which are preferably of the tiered multiple-hearth type. The material to be dried and burned, such as dewatered sludge or screenings, may be supplied to a hopper 12 at the upper end of a chute 13 passing through top 14 into a compartment above the uppermost hearth 15 in drying furnace 10. In order to prevent upward flow of gases and vapors through the chute 13 or downflow of air, the chute 13 may be provided with a pivoted door 16 normally held in closed position by a weighted arm 17. When a sufficient amount of the sewage solids has accumulated on the door 16 to overcome the action of the weighted arm 17, the door 16 will swing downwardly and permit the material to pass into the uppermost compartment and fall on the hearth 15, which may be provided with a relatively large central outlet 18.

Although the furnace 10 may comprise any suitable number of hearths, as illustrated there are four hearths in all, a hearth 19 below the hearth 15 and provided with one or more peripheral outlets 20 through which material may pass downwardly into the next lower compartment and be deposited on another hearth 21 which has a central outlet 22 through which the material is discharged on to the lowermost hearth 23 which serves as the bottom of the drying furnace or dryer. From the hearth 23 the material may be discharged through a chute or outlet 24 near the periphery of the hearth 23 and provided with a suitable door 25 preferably pivoted and normally supported in closed position by a weighted arm 26. Obviously the door 25 will open when a sufficient quantity of solid material has accumulated thereon and then close to prevent upward movement of air or other gases therethrough.

To effect movement over the various hearths to their discharge openings use may be made of any suitable rabbling means preferably comprising a hollow vertical shaft 27 extending through the central portions of the various hearths and also through the top 14 of the drying furnace. The hollow shaft 27 is of much smaller radius than the central discharge openings 18 and 22, thereby permitting discharge of the material downwardly along the vertical shaft through the hearths 15 and 21 respectively. At the other hearths and the top 14 of the furnace, suitable gas seals are provided between the shaft 21 and these hearths.

Projecting radially from the shaft 27 over the various hearths are suitable rabbling devices comprising radial arms 28 carrying blades 29 so inclined at the various hearths as to gradually work the material towards the centers of the hearths 15 and 21 and outwardly toward the peripheries of hearths 19 and 23.

Preheated air may be introduced at the upper part of the drying furnace through a fan 30, a heat exchanger 31, and a duct 32 and the air containing vaporized moisture and other vaporizable material may be discharged from the lower part of the drying furnace through a pipe or duct 33.

The drying furnace 10 may be a substantial distance above the burning furnace 11 and may be supported on the top of the burning furnace by means of suitable legs 34. From the discharge chute or outlet 24 of the drying furnace 10, the dried material may be discharged into the hopper 35, at the upper end of the chute 36 passing through top 37 of the burning furnace 11, the downward flow of material through the chute 36 being controlled by any suitable means such as a door 38 in the chute 36 normally held in closed position by a weighted arm 39.

The burning furnace 11 may have any suitable number of hearths, but, as illustrated, is provided with a plurality of hearths 40, 41, 42 and 43 of which the hearths 40 and 42 have central openings 44 and 45 and the hearths 41 and 43 have peripheral outlets 46 and 47. The lowermost hearth or bottom 43 of the burning furnace 11, as well as the top 37 are provided with central openings just large enough to permit the passage therethrough of an extension or portion of the hollow shaft 27. In order to feed the material downwardly through the burning furnace the material may be worked towards the centers of hearths 40 and 42 and towards the peripheries of hearths 41 and 43 being discharged finally from the hearth 43 through the outlet 47 and a chute 48 associated therewith and controlled by a pivoted door 49 normally held in raised position by a weighted arm 50.

The shaft 27 may extend through the burning furnace 11 and may be provided above the various hearths with rabbling devices comprising radial arms 28 and inclined plates or blades 29 so inclined as to move the material inwardly to the central discharge outlets and outwardly toward the peripherally located outlets. The hollow shaft 27 may be driven in any suitable manner as by means of a bevel gear 51 mounted thereon, a bevel gear or pinion 52 meshing with the bevel gear 51, and a driving pulley 53 directly connected with the bevel gear 52 and driven from any suitable source of power.

The air discharged from the drying furnace or dryer through the duct 33 may be introduced into the bottom of the burning furnace in an updraft flow and the hot gases of combustion may be withdrawn from the upper part and utilized in heating the hearths and top of the drying furnace. To this end the top 14 and the hearths 15, 19, 21 and 23 may be of hollow construction and may be connected in series by pipes or ducts 54 arranged around the furnace, preferably at the inner surface of the peripheral wall. Also, in order to obtain effective heat transfer both at the upper and lower sides of the intermediate trays or hearths 15, 19 and 21, each of these hearths may be provided at its interior with a generally horizontal partition 55 dividing each hearth into an upper and a lower chamber or compartment except at the central part of the hearth, so that hot gases from the upper part of the drying furnace introduced into the lower chamber through duct 56 will flow to the central part of the hearth, upwardly into the upper chamber, and outwardly to pass upwardly to enter the next hollow hearth. The hollow trays or hearths may be made of any suitable heat conducting material such as cast iron or steel.

Passing from the hollow top 14, through duct 32, the hot combustion gases are passed through the high temperature part of the heat exchanger 31 to preheat the air supplied to the drying furnace 10 through the duct 57. The flow of gases through the duct 57 and the heat exchanger 31 is induced by a suction fan 58 from which gases are discharged through a flue or stack 59.

In order to obtain the desired temperatures in the compartments or zones above different hearths, burners 60 may be provided, and doors 61 may be provided to give access to the various compartments. Waste of heat may be avoided by the use of insulating material at the upper surface of the top 14 and at the lower surface of the hollow hearth or bottom 23. It should be understood that the number of hearths may be varied when desirable.

In using the apparatus, material introduced through the hopper 12 and gate 16 falls on hearth 15 and is rabbled back and forth on hearths 15, 19, 21 and 23 to the corresponding outlets so as to be temporarily retained in layers on the hearths and passed downwardly from hearth to hearth to the gate 25 and into the hopper 35 on the gate 38, which opens intermittently under accumulation of material. The dried material is then passed downwardly in the same way through the burning furnace, the resulting ash being discharged from the chute 48 and past the gate 49. The material in the layers on the hearths of the drying furnace is subjected to the drying action of air passing into contact with the upper surfaces of said layers. Preferably the air is preheated and passes downwardly through the heating furnace, that is concurrently with the material. At the same time the air receives heat from the lower faces of the top and hearths with which it contacts, and the layers of material on the hollow hearths are heated from below by heat transmitted through the tops of the hollow hearths. The air, passing from the drying furnace laden with moisture and vapors evolved in the drying operation, is conducted to the burning furnace and passed therethrough, preferably in an upward direction or countercurrent to the movement of solid material. One advantage of the updraft flow of air and gases is that the ashes heat the air before it reaches the actual combustion zone and at the same time are cooled before being discharged from the bottom of the burning furnace. The hot gases from the burning furnace are then passed through the hollow trays or hearths of the drying furnace in series, preferably upwardly, and are then passed through the heat exchanger to the fan 58 and flue or stack 59.

In treating sewage sludge, it is customary to dewater the sludge, as by suction filtering before feeding it to the apparatus of the present invention.

It should be understood that various changes may be made and that certain features may be used without others without departing from the true scope and spirit of the invention.

Having thus described my invention, I claim:

1. In combination, a multiple-hearth drying furnace, a multiple-hearth burning furnace beneath the drying furnace and spaced therefrom, the drying furnace comprising hollow hearths and a hollow top connected in series, means including gas seals at the top and bottom of each furnace for feeding the material to be treated downwardly from hearth to hearth through the drying furnace and then through the burning furnace, means for passing preheated air downwardly through the drying furnace, means for passing the air laden with moisture and vapors evolved in the drying operation from the lower part of the drying furnace to the lower part of the burning furnace, means for passing the hot combustion gases from the upper part of the burning furnace into the lowermost hearth of the drying furnace and upwardly through the hollow hearths and the hollow top in series, and heat exchange means receiving the hot gases from said hollow top and preheating the air passing into the upper part of the drying furnace.

2. In combination, a multiple-hearth drying furnace, a multiple-hearth burning furnace beneath the drying furnace and spaced therefrom, the drying furnace comprising hollow hearths and a hollow top connected in series, means including gas seals at the top and bottom of each furnace for feeding the material to be treated downwardly from hearth to hearth through the drying furnace and then through the burning furnace, means for passing preheated air through the drying furnace, means for passing the air laden with moisture and vapors evolved in the drying operation from the drying furnace to the lower part of the burning furnace, means for passing the hot combustion gases from the upper part of the burning furnace into the lowermost hearth of the drying furnace and upwardly through the hollow hearths and the hollow top in series, and heat exchange means receiving the hot gases from said hollow top and preheating the air passing into the upper part of the drying furnace.

3. In combination, a multiple-hearth drying furnace, a multiple-hearth burning furnace beneath the drying furnace and spaced therefrom, the drying furnace comprising hollow hearths and a hollow top connected in series, means including gas seals at the top and bottom of each furnace for feeding the material to be treated downwardly from hearth to hearth through the drying furnace and then through the burning furnace, means for passing preheated air through the drying furnace, means for passing the air laden with moisture and vapors evolved in the drying operation from the drying furnace to the burning furnace, means for passing the hot combustion gases from the burning furnace into the lowermost hearth of the drying furnace and upwardly through the hollow hearths and the hollow top in series, and heat exchange means receiving the hot gases from said hollow top and preheating the air passing into the upper part of the drying furnace.

4. In combination, a multiple-hearth drying furnace, a multiple-hearth burning furnace beneath the drying furnace and spaced therefrom, the drying furnace comprising hollow hearths and a hollow top connected in series, means including gas seals at the top and bottom of each furnace for feeding the material to be treated downwardly from hearth to hearth through the drying furnace and then through the burning furnace, means for passing preheated air through the drying furnace, means for passing the air laden with moisture and vapors evolved in the drying operation from the drying furnace to the burning furnace, means for passing the hot combustion gases from the burning furnace through the hollow hearths and top in series, and heat exchange means receiving the hot gases from said hollow hearths and top and preheating the air passing into the drying furnace.

5. In combination, a multiple-hearth drying furnace, a multiple-hearth burning furnace beneath the drying furnace and spaced therefrom, the drying furnace comprising hollow hearths connected in series, means including gas seals at the top and bottom of each furnace for feeding the material to be treated downwardly from hearth to hearth through the drying furnace and then through the burning furnace, means for passing air through the drying furnace, means for passing air laden with moisture and vapors evolved in the drying operation from the drying furnace to the burning furnace, and means for passing the hot combustion gases from the burning furnace through the hollow hearths in series.

6. In combination, a multiple-hearth drying furnace having a peripheral wall, a multiple-hearth burning furnace beneath the drying furnace and spaced therefrom, the drying furnace comprising hollow hearths connected in series, by one or more ducts at the inner surface of said peripheral wall, means including gas seals at the top and bottom of each furnace for feeding the material to be treated downwardly from hearth to hearth through the drying furnace and then through the burning furnace, means for passing air through the drying furnace, means for passing the air laden with moisture and vapors evolved in the drying operation from the drying furnace to the burning furnace, and means for passing the hot combustion gases from the burning furnace through the hollow hearths in series.

7. In combination, a multiple-hearth drying furnace having a peripheral wall, a multiple-hearth burning furnace beneath the drying furnace and spaced therefrom, the drying furnace comprising hollow heat exchange hearths connected in series, by a plurality of heat exchange ducts along the inner surface of said peripheral wall, means including gas seals at the top and bottom of each furnace for feeding the material to be treated downwardly from hearth to hearth through the drying furnace and then through the burning furnace, means for passing air through the drying furnace, means for passing the air laden with moisture and vapors evolved in the drying operation from the drying furnace to the burning furnace, and means for passing the hot combustion gases from the burning furnace through the hollow hearths in series.

8. The method of incineration which comprises passing material of high moisture and volatile content downwardly through a plurality of zones while drying the same, through a zone at atmospheric conditions and a plurality of zones while burning the dried material, retaining said material temporarily in each of the drying zones and the burning zones, moving said material substantially horizontally through each of said drying and burning zones by the application of a series of rabbling impulses thereto, passing a stream of air downwardly through the drying zones concurrently with the flow of said material, passing air laden with moisture and vapor evolved in the drying zones upwardly through the burning zones, countercurrent to the flow of material, and heating the air and solids passing through the drying zones by passing the hot gases of combustion from the burning zones below, at the side and above each drying zone.

9. The method of incineration which comprises passing material of high moisture and volatile content downwardly through a plurality of zones while drying the same, through a zone at atmospheric conditions and a plurality of zones while burning the dried material, retaining said material temporarily in each of the drying zones and the burning zones, moving said material substantially horizontally through each of said drying and burning zones by the application of a series of rabbling impulses thereto, passing a stream of air downwardly through the drying zones concurrently with the flow of said material, passing air laden with moisture and vapor evolved in the drying zones upwardly through the burning zones, countercurrent to the flow of material, heating the air and solids passing through the drying zones by passing the hot gases of combustion from the burning zones below and above each drying zone, and then passing the gases of combustion into heat exchange relation with the stream of air flowing to the drying zones.

WILLIAM RAISCH.